United States Patent [19]

Isobe et al.

[11] Patent Number: 5,045,390
[45] Date of Patent: Sep. 3, 1991

[54] MAGNETIC RECORDING MEDIUM

[75] Inventors: Ryosuke Isobe; Yasuo Ando, both of Hino, Japan

[73] Assignee: Konica Corporation, Tokyo, Japan

[21] Appl. No.: 339,496

[22] Filed: Apr. 17, 1989

[30] Foreign Application Priority Data

Apr. 22, 1988 [JP] Japan .................. 63-100918
Apr. 28, 1988 [JP] Japan .................. 63-107213

[51] Int. Cl.$^5$ ............................................. G11B 23/00
[52] U.S. Cl. .................................... 428/329; 428/694; 428/900
[58] Field of Search .............. 428/329, 694, 900, 403; 252/62.58, 62.55, 62.54

[56] References Cited

U.S. PATENT DOCUMENTS

| | | | |
|---|---|---|---|
| 4,537,833 | 8/1985 | Kasuga et al. | 428/403 |
| 4,554,089 | 11/1985 | Umemura et al. | 428/403 |
| 4,689,265 | 8/1987 | Miyoshi et al. | 252/62.55 |
| 4,801,505 | 1/1989 | Ejiri et al. | 428/403 |
| 4,874,668 | 10/1989 | Asada et al. | 428/403 |
| 4,882,224 | 11/1989 | Moro et al. | 428/403 |
| 4,933,014 | 6/1990 | Kathrein et al. | 428/403 |

FOREIGN PATENT DOCUMENTS 238069 9/1987 European Pat. Off. .

OTHER PUBLICATIONS

Japanese Patent Gazette, week 8733, Accession No. 87/230990/33 JPA-62-154,229 (English Abstract).
Japanese Patent Gazette, week 8807, Accession No. 88/044828/07 JPA-63-00/003 (English Abstract).

Primary Examiner—Paul J. Thibodeau
Attorney, Agent, or Firm—Jordan B. Bierman

[57] ABSTRACT

A magnetic recording medium is disclosed. The magnetic recording medium is capable of high density recording; has excellent electromagnetic conversion properties including S/N ratio; whose magnetic powder has good dispersibility and good corrosion resistance; and that has good durability. The magnetic recording medium comprises a binder and magnetic metal powder dispersed in the binder and the magnetic metal powder has a specific surface area of not less than 45 m$^2$/g, and comprises comprise iron atoms and aluminum atoms in an abundance ratio of from 100:1 to 100:20 in terms of the number of atoms, and abundance ratio of iron atoms to aluminum atoms in the superficial portion of individual particles of the magnetic powder is from 30:70 to 70:30 in terms of the number of atoms.

5 Claims, 3 Drawing Sheets

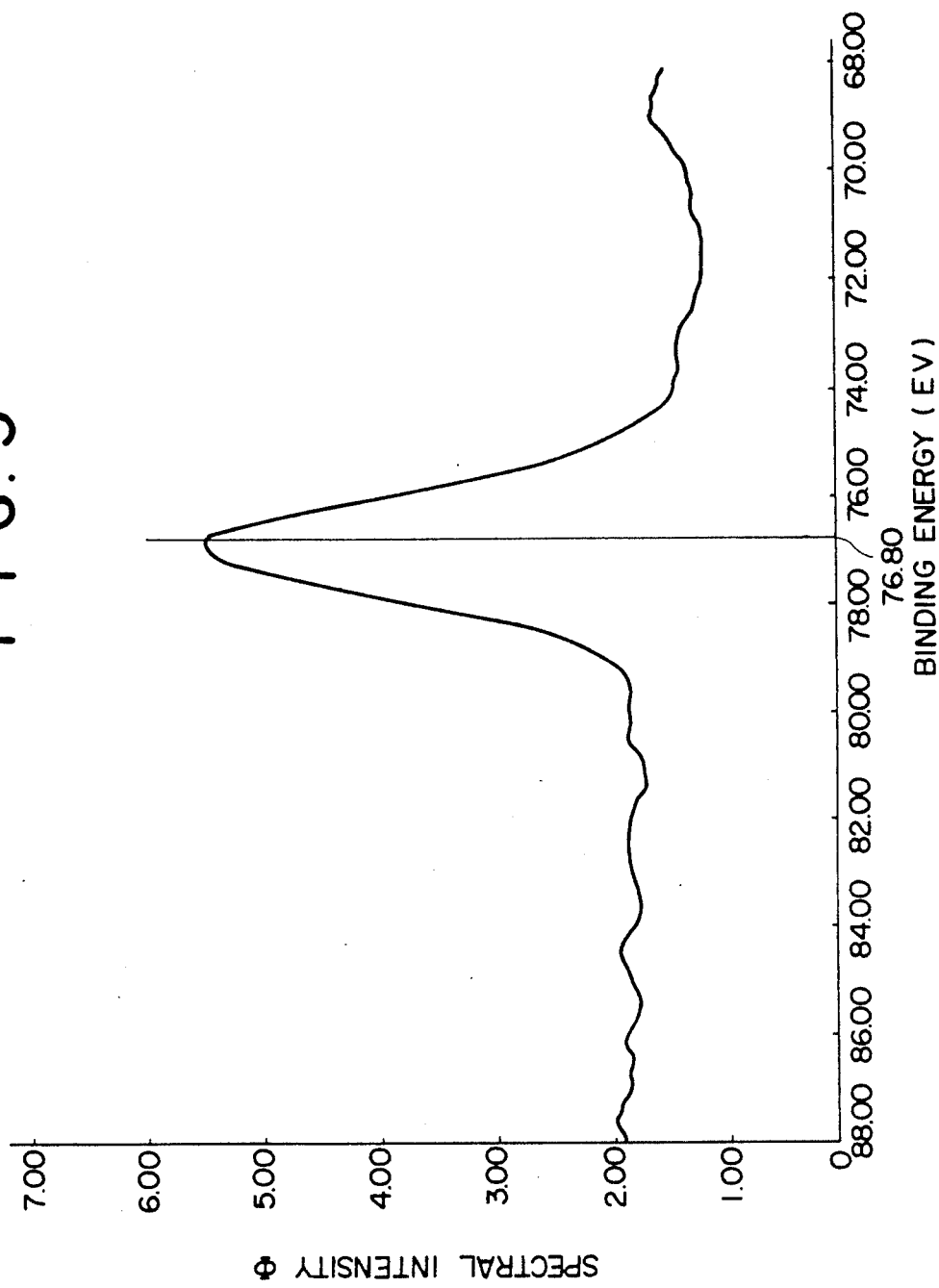

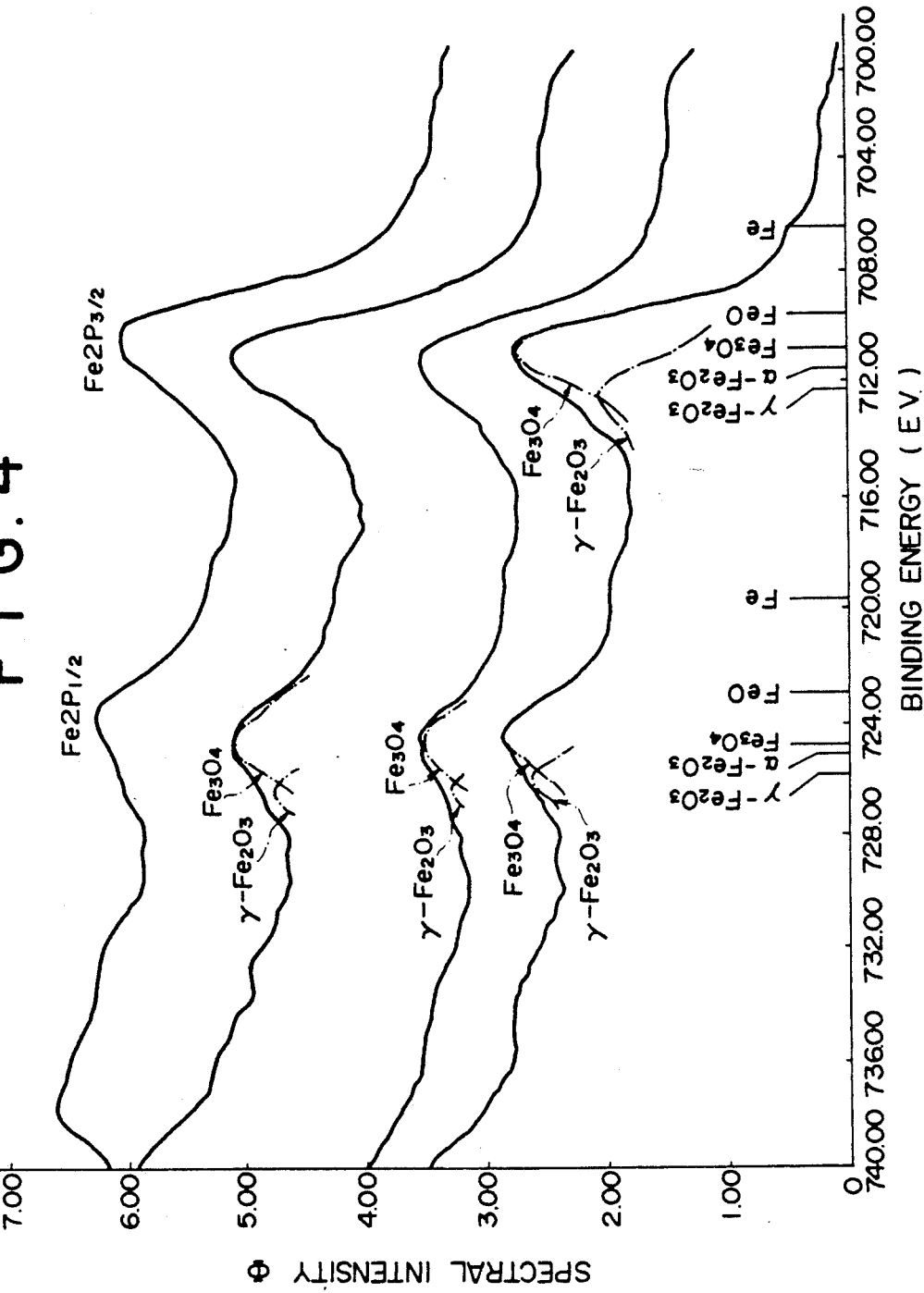

MAGNETIC RECORDING MEDIUM

FIELD OF THE INVENTION

The present invention relates to a magnetic recording medium such as a magnetic tape, magnetic sheet, and magnetic disk.

BACKGROUND OF THE INVENTION

The higher density and higher S/N ratio of recent magnetic recording medium such as a magnetic tape requires increasingly finer-sized magnetic powder.

According to a widely accepted theory, the S/N ratio of a magnetic recording medium is proportional to the square root of a number of magnetic particles in a specific amount of recording material that is responsible for recording and reproducing data. Therefore, if a specific weight of magnetic powder is employed for coating, a powder of smaller particle size is more advantageous in improving the S/N ratio. Additionally, using finer magnetic particles for improving the BET value of the magnetic powder accordingly results in smooth-surfaced magnetic layer, and, also, smaller spacing loss, this in turn is advantageous in attaining higher electromagnetic conversion properties. Using magnetic metal powder enables further enhanced high-density recording, thereby improves the performance of the magnetic recording medium.

To sum up, the magnetic metal powder has large saturated magnetization and large coercive force, and therefore, excels in characteristics for high-density recording material. However, its high surface activity incurs the following two problems:

(1) Oxidation resistance of magnetic metal powder in air

The magnetic metal powder, when allowed to stand in air, gradually develops deterioration in magnetic property due to progressive oxidation.

(2) Dispersibility in binder

Higher surface activity of magnetic metal powder, when the powder is dispersed in a binder, results in poor dispersibility of the powder. Dispersing the magnetic metal powder is quite difficult, and, in the worst case, the similar powder gelate a binder resin in a coating solution.

The scope of applications of video tapes has been more diversified recently, and video tapes are subjected to various operating conditions. Therefore, good corrosion resistance is required of video tapes.

SUMMARY OF THE INVENTION

The object of the invention is to provide a magnetic recording medium that is capable of high density recording; has excellent electromagnetic conversion properties including S/N ratio; whose magnetic powder has good dispersibility and good corrosion resistance; and that has good durability.

The object of the invention can be accomplished by a magnetic recording medium comprising a binder and magnetic metal powder dispersed in the binder wherein the magnetic metal powder has a specific surface area of not less than 45 $m^2/g$, and comprises iron atoms and aluminum atoms in a ratio (Fe atoms: Al atoms) of from 100:1 to 100:20 in terms of the number of atoms, and the abundance ratio of iron atoms to aluminum atoms (Fe atoms: Al atoms) in the superficial portion of individual particles of the magnetic powder is from 30:70 to 70:30 in terms of the number of atoms.

In a preferable embodiment of the invention, the aluminum atoms present in the superficial portion of individual particles of the magnetic metal powder are in a state of bounded with oxygen atoms.

BRIEF DESCRIPTION OF THE DRAWINGS

Each of FIGS. 1 and 2 is a partially enlarged cross section illustrating one example of magnetic recording medium of the invention;

FIG. 3 graphically illustrates contents of aluminum atoms in the surface regions of individual magnetic metal particles;

FIG. 4 graphically illustrates degree of oxidation of iron atoms in the superficial portion of individual magnetic metal particles.

DETAILED DESCRIPTION OF THE INVENTION

Figure 1:
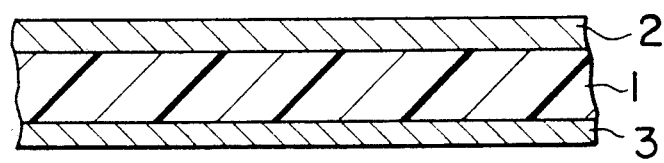

Owing to a magnetic metal powder whose specific surface area being not less than 45 $m^2/g$, the present invention provides a recording medium that is capable of high density recording and has an excellent S/N ratio and other properties. It is more preferable that the magnetic metal powder has a specific surface area within the range of from 50$m^2/g$ to 70$m^2/g$.

The significance of the invention is that a magnetic metal powder contains both iron atoms and aluminum atoms in specific amounts, wherein the invention specifies the abundance ratio of iron atoms to aluminum atoms both present in the surface region of individual magnetic metal particles.

To be more specific, according to the invention, the abundance ratio of iron atoms to aluminum atoms is limited to 100:1 to 100:20, thereby a sufficient amount of iron atoms is incorporated into individual particles, so that iron series magnetic powder of good electrical properties is provided. At the same time, a sufficient amount of aluminum atoms is likewise incorporated, so that corrosion resistance properties of aluminum atoms are positively provided. The particularly preferable abundance ratio of iron atoms to aluminum atoms is 100:1 to 100:8.

However, presence of a large amount of iron atoms in the superficial portion of individual magnetic metal particles, together with the specific surface area of not less than 45 $m^2/g$, allows individual particles to be not only readily oxidized but also aggregated, resulting in loss in dispersibility, and, even worse, resulting in deteriorated durability of a magnetic recording medium.

The present invention limits the abundance ratio, in terms of number of atoms, of iron atoms to aluminum atoms in the superficial portion of individual magnetic metal particles to 30:70 to 70:30, thereby a sufficient amount of aluminum atoms is incorporated into the superficial portion, so that corrosion resistance action of aluminum atoms is positively provided and thereby oxidation of magnetic powder is inhibited and dispersibility of the particles is improved. In contrast, if the abundance ratio of iron atoms in the surface region of individual particles is greater than the above-mentioned range, corrosion resistance and dispersibility of magnetic powder are insufficient. If the abundance ratio of iron atoms is smaller than the above-mentioned range, polar groups in aliphatic acid and binder are more readily adsorbed, resulting in poor pot life of a resultant magnetic coating solution.

In a preferable embodiment of the invention, aluminum atoms present in the surface region of individual magnetic metal particles are coupled with oxygen atoms, so that the amount active sites in individual magnetic metal particles is further smaller, thereby surface activity is inhibited. Accordingly, corrosion resistance and dispersibility of magnetic metal powder are further improved, resulting in a much durable magnetic recording medium.

To allow oxidized Aluminum or iron atoms to be present in the superficial portion of magnetic metal particles, there is a method where magnetic metal powder is allowed to stand in an atmosphere that has oxygen or OH group in a limited amount enough for oxidizing the superficial portion of the magnetic metal particles. The "superficial portion" according to the invention is defined as "superficial portion of magnetic particles, not deeper than approx. 100 Å from the surface toward core, where the depth is analyzed by ESCA (electron spectroscopy for chemical analysis).

Magnetic metal powder obtained by a dry reducing process is preferable used in the invention, where iron oxide is reduced with hydrogen or the like.

The examples of a magnetic metal powder type of the invention are Fe-Al, Fe-Al-Zn and Fe-Al-Co.

The magnetic metal powder of the invention is prepared according to the following process, for example. An iron hydroxide such as $\alpha$-FeOOH and $\gamma$-FeOOH or an iron oxide such as $\alpha$-Fe$_2$O$_3$, $\gamma$-Fe$_2$O$_3$ and Fe$_3$O$_4$ is reduced using H$_2$ or the like at a high temperature.

More specifically, a ferrous salt compound such as FeSO$_4$ and FeCl$_2$ is allowed to react with an alkali such as NaOH, thereby $\alpha$-FeOOH is generated. The so-obtained $\alpha$-FeOOH is reduced using, for example, H$_2$ or, otherwise, the $\alpha$-FeOOH is converted into $\alpha$-Fe$_2$O$_3$, thereby ether of which is reduced using, for example, H$_2$ at a high temperature to obtain magnetic metal powder. In any of these steps, an A( compound such as sodium aluminate can be added in accordance with a specific requirement. This explanation also applies to a case where in conjunction with Al, compound other than that of Fe is added. In the other preferable embodiment of the invention, the iron atoms in the superficial portion of the magnetic metal particle is in an oxidized state defined as FeO$_x$ ($4/3 \leq X \leq 3/2$).

In this embodiment, the iron atoms present in the surface region of individual is in the oxidized state defined as FeO$_x$ ($4/3 \leq X \leq 3/2$), thereby the iron atoms in the above-mentioned surface region remain as stable iron oxide. Therefore, oxidation of the magnetic metal powder is inhibited, and, accordingly, corrosion resistance is improved. Meanwhile, when intact iron atoms are present in the superficial portion of individual particles of magnetic metal powder, these atoms serve as active sites, thereby resultant particle aggregation causes loss in dispersibility as well as solvation by iron atoms, further resulting in deteriorated durability of a magnetic recording medium. According to the invention, such particle aggregation as well as solvation are prevented, thereby dispersibility is improved, and amount of residual solvent remaining in a magnetic recording medium is smaller, and, as a result, the durability of a similar recording medium can be improved.

The specific surface area mentioned above is expressed in BET value, and which means a surface area per unit weight, and is a physical unit totally different from average grain size. Accordingly, with two types of powder having a common average grain size, one type can have a larger specific surface area, while the other can have a smaller specific surface area. In measuring a specific surface area, powder is, for example, first subjected to deaeration with heating at approximately 250° C. for 30 to 60 minutes, thereby what have been adsorbed on powder particles are eliminated, and then, the powder is introduced into a measuring apparatus, and measurement based on nitrogen adsorption is performed at a liquid nitrogen temperature ($-195°$ C.) with the initial nitrogen pressure of 0.5 kg/m$^2$ (measurement technique for specific surface area known as BET technique, for details, refer to Journal of American Chemical Society, 60 309 (1938). A measurement apparatus applicable to measuring the specific surface area (BET value) is "powder measurement apparatus, Countersorb, manufactured jointly by Yuasa Battery Co., Ltd. and Yuasa Ionics Co., Ltd. General description of the specific surface area and measuring methods is detailed in "Measurement of Powder" (J. M Dallavalle & Clydeorr Jr, translated by Muta et. al., published from "Sangyo Tosho"), and also is described in "Chemical Handbook" (Application Section. pp. 1170–1171, Society of Chemistry in Japan, published from Maruzen, Apr. 30, 1966) (the term "surface area" in m$^2$/g described in "Chemical Handbook" above is identical to "specific surface area" in this specification).

A binder useful in the present invention is one whose average molecular weight being approx. 10000 to 200000, and the examples of which include a urethane resin, a vinyl chloride-vinyl acetate copolymer, a vinyl chloride-vinilidene chloride copolymer, a vinyl chloride-acrylnitrile copolymer, a butadiene-acrylnitrile copolymer, a polyamide resin, a polyvinyl butyral, cellulose derivatives such as cellulose acetate butylate, cellulose diacetate, cellulose triacetate, cellulose propionate, and nitrocellulose, a styrene-butadiene copolymer, polyester resin, various synthetic rubbers, a phenol resin, an epoxy resin, a urea resin, a melamine resin, a phenoxy resin, silicone resin, an acryl-based reactive resin, a mixture of high-molecular polyester resin and isocyanate prepolymer, a mixture of polyester polyol and polyisocyanate, a urea-formaldehyde resin, a low-molecular glycol/high-molecular diol/isocyanate mixture, and mixtures of the above-mentioned materials.

These resins are preferably those having a hydrophilic polar group such as —SO$_3$M. —COOM, and —PO(OM')$_2$; wherein M represents a hydrogen atom, or an alkali metal atom such as lithium, potassium, and sodium, and M' represents a hydrogen atom, or an alkali metal atom such as lithium, potassium, and sodium, or a hydrocarbon residue. This is because an intramolecular polar group allows such a resin to have much improved affinity with magnetic metal powder, thereby the dispersibility of magnetic powder is improved and aggregation of the magnetic metal powder is inhibited, thus further improving the stability of coating solution, and, as a result, also improving the durability of a magnetic recording medium.

Useful binders, especially vinyl chloride-based copolymers, can be obtained by subjecting, to copolymerization, a vinyl chloride monomer and a copolymeriable monomer that contains sulfonic or phosphoric alkali salt, as well as, according to a specific requirement, another copolymeric monomer. The intended copolymer is readily synthesized owing to vinyl synthesis. Furthermore, since copolymeric units are arbitrarily selected, optimum properties for the resultant copolymer can be attained.

The metal in the above-mentioned sulfonic or phosphoric salt is an alkali metal (especially, sodium, potassium, and lithium). The most advantageous is potassium because of its solubility, reactivity and resultant yield.

The examples of the above-mentioned copolymerizable monomer containing sulfonic salt are as follows:

$CH_2=CHSO_3M$
$CH_2=CHCH_2SO_3M$
$CH_2=C(CH_3)CH_2SO_3M$
$CH_2=CHCH_2OCOCH(CH_2COOR)SO_3M$
$CH_2=CHCH_2OCH_2(OH)CH_2SO_3M$
$CH_2=C(CH_3)COOC_2H_4SO_3M$
$CH_2=CHCOOC_4H_8SO_3M$
$CH_2=CHCONHC(CH_3)_2CH_2SO_3M$

The examples of the above-mentioned copolymerizable monomer containing phosphoric salt are as follows:

$CH_2=CHCH_2OCH_2CH(OH)CH_2-O-PO_3MY^1$
$CH_2=CHCONHC(CH_3)_2CH_2-O-PO_3MY^2$

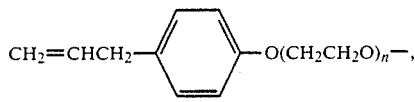

$CH_2=CHCH_2O(CH_2CH_2O)_mPO_2MX^2$ wherein M represents an alkali metal atom; R represents an alkyl group having 1 to 20 carbon atoms; $Y^1$ represents H, M or $CH_2=CHCH_2OCH_2CH(OH)CH_2$-; $Y^2$ represents H, M or $CH_2=CHCONHC(CH_3)_2CH_2$-; $X^1$ represents

OH or OM; $X^2$ represents $CH_2=CHCH_2O(CH_2CH_2O)_m$-, OH or OM; n represents an integer 1 to 100; m represents an integer 1 to 100.

The copolymeriable monomer subjected to copolymerization, in accordance with a specific requirement is a known polymeriable monomer, and the examples of which include various vinyl esters, vinilidene chloride, acrylnitrile, methacrylnitrile, styrene, acrylic acid, methacrylic acid, various acrylic acid esters, methacrylic acid esters, ethylene, propylene, isobutene, butadiene, isoprene, vinyl ether, aryl ether, aryl ester, acrylamide, methacrylamide, maleic acid, and maleic acid ester.

The above-mentioned binders are prepared by polymerization such as emulsification polymerization, solution polymerization, suspension polymerization, and mass polymerization. In any of these processes, known methods are performed according to a specific requirement, and the examples of such methods include intermittent or continuous addition of a molecular weight adjuster, polymerization initiator and monomers.

The preferred monomer percentage in the above-mentioned acid salt in a binder of the invention is 0.01 to 30 mol%. A salt of excessively high monomer percentage results in poor solubility of a binder in a solvent, or readily causes gelation. A salt of excessively small monomer percentage causes failure in attaining intended properties.

Furthermore, the vinyl chloride based copolymer above preferably contains an epoxy group or hydroxy group. Incidentally, a conventional vinyl chloride based copolymer (for example, VAGH manufactured by U.C.C.) comprises the following copolymeric units.

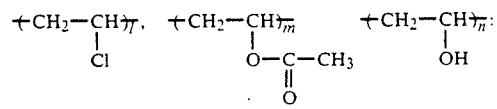

each represents a copolymeric unit wherein a $CH_3CO-O-$ group does not seem to promote crosslinking reaction of the binder with a hardener or the like. Therefore, it is preferable to replace $CH_3CO$ with an epoxy group such as

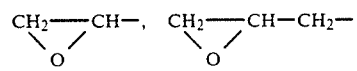

One preferred copolymer is one that has the following units:

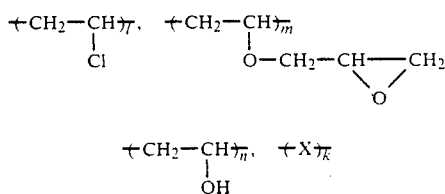

wherein X represents a monomer unit containing an alkali metal salt of a sulfo group or phospho group.

A binder particularly preferably incorporates at least a urethane resin, and, further preferably, also incorporates a vinyl chloride copolymer, an epoxy resin especially, a phenoxy resin, a polyester resin, or a nitrocellulose resin (these resins are hereinafter referred to as another (other) resin(s)). When using a urethane resin along with another resin, the proportion of another resin is 90 to 10 wt parts, or, preferably, 80 to 20 wt parts. A proportion of another resin, exceeding 90 wt parts, results in too vulnerable a coated layer whose durability being significantly poor, and, at the same time, a coated layer does not stably adhere to a support of a magnetic recording medium. A proportion of another resin, less than 10 wt parts, results in more frequently falling-off of magnetic powder.

Incorporating carbon black into a magnetic layer further improves traveling properties and electromagnetic conversion properties of a magnetic recording medium, and, this arrangement also marginally improves the dispersibility of binder resins, and further decreases an amount of residual solvent in a magnetic recording layer.

Carbon black for light-shielding grade can further enhance the degree of light-shielding. The examples of applicable carbon black of light-shielding grade include Raven 2000 (specific surface area, 1190 m²/g, grain size 18 mµ), Raven 2100, Raven 1170, and Raven 1000, each manufactured by Columbian Carbon; and #100, #75, #40, #35, and #30, each manufactured by Mitsubishi Chemical Industries Ltd.

The examples of electrical conductive carbon black include Conductex 975 (BET value, hereinafter referred to as BET, 250 m²/g; DBP oil absorption, hereinafter referred to as DBP, 170 ml/100 g; grain size, 24 mµ), Conductex 900 (BET, 125 m$^2$/g; grain size, 27 mµ), Conductex 40-220 (grain size, 20 µm ), Conductex SC (BET, 220 m$^2$/g; DBP, 115 ml/100 g; grain size, 20 m ), each manufactured by Columbian Carbon; Vulcan XC-72 (specific surface area, 254 m$^2$/g; grain size, 30 mµ), and Vulcan P (BET, 143 m$^2$/g; DBP, 118 ml/100 g; grain size, 20 mµ), Raven 1040, Raven 420, Black Pearls 2000 (grain size, 15 mµ), each manufactured by Cabot; and #44 of Mitsubishi Chemical Industries Ltd.

The examples of other applicable carbon blacks include Vulcan 9 (BET, 140 m$^2$/g; DBP, 114 ml/100 g; grain size, 19 mµ) manufactured by Cabot; #80 of Asahi Carbon (BET, 117 m$^2$/g; DBP, 113 ml/100 g; grain size, 23 mµ); HS100 of DENKI KAGAKU (BET, 32 m$^2$/g; DBP, 180 ml/100 g; grain size, 53 mµ); #22B (BET, 55 m$^2$/g; DBP, 131 ml/100 g; grain size, 40 mµ), #20B (BET, 56 m$^2$/g; DBP, 115 ml/100 g; grain size, 40 mµ), and #3500 (BET, 47 m$^2$/g; DBP, 187 ml/100 g; grain size, 40 mµ), each manufactured by Mitsubishi Chemical Industries Ltd. The examples further include CF-9, #4000, and MA-600 of Mitsubishi Chemical Industries Ltd.; Black Pearls L, Monarck 800, Black Pearls 700, Black Pearls 1000, Black Pearls 880, Black Pearls 900, Black Pearls 1300, Black Pearls 2000, and Sterling V, each manufactured by Cabot; Raven 410, Raven 3200, Raven 420, Raven 450, Raven 825, Raven 1255, Raven 1035, Raven 1000, Raven 2000, Raven 5000, and Ketchen Black FC, each manufactured by Columbian Carbon.

Additionally, according to the invention, to improve durability of a magnetic recording medium, to a magnetic coating solution containing a binder can be added a polyisocyanate based hardener. The examples of such a polyisocyanate based hardener include conventional hardeners, for example, bivalent isocyanates such as trilenediisocyanate, diphenylmethanediisocyante, and hexanediisocyanate; trivalent isocyanates such as Coronate L (Japan Polyurethane Co.), and Desmodur L (Bayer); a urethane polymer having on its both ends isocyanate groups; and other polyisocyanates that can be used as a hardener. The amount of polyisocyanate based hardener is 5 to 80 wt parts per total amount of binder.

Figure 2:
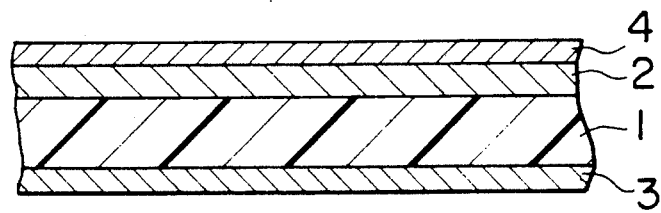

A magnetic recording medium of the invention comprises, for example, as shown in FIG. 1, a non-magnetic support 1 of polyethylene terephthalate or the like disposed thereon a magnetic layer 2, and on the other face of the support 1 is provided, according to a specific requirement, a back coating layer (BC layer) 3. As shown in FIG. 2, an over-coating layer (OC layer) 4 may be additionally formed on the magnetic layer 2 of the magnetic recording medium in FIG. 1.

The magnetic recording medium either in FIG. 1 or FIG. 2 may have or may not have a subbing layer (unshown) between the magnetic layer 2 and the support 1. The support may be subjected to corona discharge treatment.

The magnetic layer 2 can contain a fatty acid and/or fatty acid ester as a lubricant, in addition to a magnetic metal powder and a binder each mentioned above. By doing so, the characteristics of both fatty acid and ester thereof are fully demonstrated, and the deficiency that will be otherwise manifest when both are independently employed is compensated by simultaneously using both fatty acid and ester thereof. Lubrication action is further enhanced by carbon black, and thereby still image durability, traveling stability and S/N ratio are further improved. For this purpose, the preferred amount of fatty acid added is within a range of 0.2 to 10 wt parts, in particular, 0.5 to 8.0 wt parts per 100 wt parts of magnetic powder. If the amount of fatty acid is lower than this range, the dispersibility of the magnetic powder is smaller, and the traveling properties of the recording medium tends to become poor; if the amount is higher than this range, the fatty acid tends to be eluted from a medium, and the output level tends to be lower. The preferred amount of fatty acid ester added is within a range of 0.1 to 10 wt parts, in particular, 0.2 to 8.5 wt parts per 100 wt parts of magnetic powder. If the amount of fatty acid ester is lower than this range, the improvement on the traveling properties is less significant; if the amount is higher than this range, fatty acid ester tends to be eluted from the medium, and the output level tends to be lower.

To achieve the above effects more positively, the preferred weight ratio of fatty acid to fatty acid ester 10/90 to 90/10. Fatty acid also has dispersing property, and it can contribute to decreasing amount of a low molecular dispersing agent used. Therefore, a better Young's modulus of the magnetic recording medium can be expected.

The fatty acids applicable to this purpose may be either monobasic or dibasic types. The preferred fatty acids independently have 6 to 30, particularly, 12 to 22 carbon atoms. The typical such fatty acids are as follows:

(1) caproic acid
(2) caprylic acid
(3) capric acid
(4) lauric acid
(5) myristic acid
(6) palmitic acid
(7) stearlic acid
(9) isostearlic acid
(9) linolenic acid
(10) linoleic acid
(11) oleic acid
(12) elaidic acid
(13) behenic acid
(14) malonic acid
(15) succinic acid
(16) maleic acid
(17) glutaric acid
(18) adipic acid
(19) pimelic acid
(20) azelaic acid
(21) sebacic acid
(22) 1,12-dodecandicarboxylic acid
(23) octanedicarboxylic acid The examples of fatty acid ester are as follows:
(1) oleyl olate
(2) oleyl stearate
(3) isocetyl stearate
(4) dioleyl maleate
(5) butyl stearate
(6) butyl palmitate
(7) butyl myristate
(8) octyl myristate
(9) octyl palmitate
(10) amyl stearate
(11) amyl palmitate
(12) isobutyl oleate
(13) stearyl stearate
(14) lauryl oleate
(15) octyl oleate
(16) isobutyl oleate

(17) ethyl oleate
(18) isotridecyl oleate
(19) 2-ethylhexyl stearate
(20) 2-ethylhexyl myristate
(21) ethyl stearate
(22) 2-ethylhexyl palmitate
(23) isopropyl palmitate
(24) isopropyl myristate
(25) butyl laurate
(26) cetyl-2-ethyl hexalate
(27) dioleyl adipate
(28) diethyl adipate
(29) diisobutyl adipate
(30) diisodecyl adipate Other than the above-exemplified fatty acids or fatty acid esters, the magnetic layer may contain other lubricants such as silicone oil that is either carboxylic acid modified or ester modified; and graphite, fluorocarbon, molybdenum disulfide, tungsten disulfide, fatty acid amide and α-olefine oxide.

The magnetic layer may also incorporate non-magnetic abrasive particles, and the examples of this abrasive include α-alumina, chromium oxide, titanium oxide, α-iron oxide, silicon oxide, silicon nitride, silicon carbide, zirconium oxide, zinc oxide, cerium oxide, magnesium oxide, and boron nitride. The preferred average particle size of such an abrasive is 0.6 μm, in particular, not more than 0.3 μm. The preferred Moh's hardness of such an abrasive is not less than 5.

The magnetic layer may further contain a charge controlling agent such as graphite, and a dispersing agent such as powder lecithin and phosphoric ester, as well as carbon black.

The preferred average particle size of non-magnetic powder the back coating layer may contain is 10 to 1000 mμ. This range of particle size means not too fine particles, and hence effect by addition is satisfactory.

The examples of applicable non-magnetic powder include silicon oxide, silicon carbide, calcium carbide, zinc oxide, α-Fe$_2$O$_3$, talc, caolin, calcium sulfate, boron nitride, zinc fluoride, molybdenum dioxide, calcium carbonate, and barium sulfate. Other useful non-magnetic powder include organic powder whose types being benzoguanamine resin, and melamine resin, as well as phthalacyanine dye. Such organic powder can be used in conjunction with the previously mentioned inorganic powder.

Using carbon black in conjunction with the previously mentioned inorganic powder is particularly preferable. This arrangement further stabilizes the traveling properties of a magnetic recording medium, and, together with the previously mentioned action of non-magnetic powder, further improves durability of a magnetic recording medium.

EXAMPLES

The examples of the present invention are hereunder described. However embodiment of the invention is not limited to the examples.

Incidentally, the term "part" in the following examples always means "part by weight".

EXAMPLE 1

(Preparation of video tape)

First, according to a process described below, each magnetic layer was formed on a 10 μm thick polyethylene terephthalate base film serving as a support.

Next, a specific magnetic powder and the ingredients listed in Table 1 were dispersed, and the resultant magnetic paints were filtered through a 1 μm sieve filter, and then 5 parts multifunctional isocyanate was added, and thereafter the support was coated with the resultant dispersion in a thickness of 2.5 μm and treated with a super calender. Thus the magnetic layers having the properties and compositions shown in Table 1 were formed.

Incidentally, for magnetic metal powders, the iron-Al content ratio in individual magnetic metal particles as well as abundance ratio of both atom types are summarized in Table 1. The abundance ratio was measured, according to the ESCA, by determining an abundance ratio at an analysis depth of approx. 100Å and less from the surface toward inside. The Fe-Al content ratio was measured by an X ray spectroscopy.

FIG. 3 graphically shows the degrees of oxidation of aluminum atoms in the superficial portion of individual magnetic particles.

In FIG. 3, the vertical axis corresponds with a spectral intensity measured with a counter, while the horizontal axis corresponds with cohesive energy (eV). The peak level of the binding energy shown is at 76.8 eV, whereas according to a handbook, non-oxidized pure aluminum has peak binding energy of 72.7 eV in contrast with the peak level of aluminum oxide, i.e. 76.8 eV.

Next, an opposite face of the support was coated with a paint for BC layer having the following ingredients, so that the dry thickness was 0.4 m.

| | |
|---|---|
| Carbon black (average size. 50 mμ) | 40 parts |
| Barium sulfate | 10 parts |
| N-2301 (Nippon Polyurethane) | 25 parts |
| Coronate L (Nippon Polyurethane) | 10 parts |
| Cyclohexanone | 400 parts |
| Methyl ethyl ketone | 250 parts |
| Toluene | 250 parts |

Thus, the wide magnetic films respectively having a magnetic layer and BC layer of prescribed thicknesses were prepared and rolled up. A respective magnetic film was cut into 8 mm width tapes to form the video tapes specified in Table 1 (each video tape corresponding with the identification number of example or comparative example). The "parts" in the second row and below in Table 1 are in parts by weight.

Incidentally, for measuring scratches on the video tape, ½" (12.65 mm) video tapes were used. (Performance measurement of video tapes)

The measurements of performance resultant from the so-obtained tapes are listed in Table 1. The evaluation criteria those data were based on are as follows.

Luminance S/N:

Determined using a color video noise meter "Shibasoku, Model 925 D/1". The threshold level of the high-pass filter was 4.2 MHz; that of the low-pass filter was 10 KHz. The VTR used was an 8 mm video deck.

Still image endurance:

This is a duration, represented in minutes, where the level of a still image decreases by 2 dB. The larger the level is, the greater the endurance and wear resistance of the magnetic recording medium.

Saturated magnetization residual rate:

The sample tape was allowed to stand for 1 week under the conditions of 60° C., and 80% RH, and then the saturated magnetization was measured. The residual magnetization is represented by percentage of the saturated magnetization after aging of the initial saturated magnetization.

N: Normal
P: Poor

TABLE 1

|  |  |  | Ex No. 1 | Ex No. 2 | Ex No. 3 | Ex No. 4 | Ex No. 5 | Ex No. 6 |
|---|---|---|---|---|---|---|---|---|
| Magnetic paint composition | Magnetic metal powder | (Composition) | 100 parts (Fe—Al) | 100 parts (Fe—Al) | 100 parts (Fe—Al) | 100 parts (Fe—Al) | 100 parts (Fe—Al) | 100 parts (Fe—Al) |
|  |  | Content ratio (in terms of number of atoms) Fe:Al | 100:5 | 100:5 | 100:20 | 100:5 | 100:5 | 100:1 |
|  |  | Abundance ratio (in terms of number of atoms) Fe:Al | 50:50 | 50:50 | 50:50 | 70:30 | 30:70 | 50:50 |
|  |  | Specific surface area: BET value ($m^2/g$) | 45 | 50 | 50 | 50 | 50 | 50 |
|  | Vinyl chloride copolymer |  | 13 parts |  |  |  |  |  |
|  | Polyurethane |  | 10 parts |  |  |  |  |  |
|  | Alumina |  | 9 parts |  |  |  |  |  |
|  | Methylethyl ketone |  | 250 parts | Same as left | Same as left | Same as left | Same as left | Same as left |
|  | Toluene |  | 200 parts |  |  |  |  |  |
|  | Cycionexanone |  | 100 parts |  |  |  |  |  |
|  | Stearic acid |  | 2 parts |  |  |  |  |  |
|  | Butyl stearate |  | 1 part |  |  |  |  |  |
| Properties | Luminance S/N ratio (dB) |  | 1.0 | 2.0 | 1.5 | 1.5 | 1.5 | 1.5 |
|  | Still image endurance (min.) |  | >120 | >120 | >120 | >120 | >120 | >120 |
|  | Residual saturated magnetization (%) |  | 95 | 93 | 94 | 92 | 95 | 94 |
|  | Powder falling-off |  | E | G | E | E | G | E |
|  | Magnetic head clogging |  | G | E | E | G | G | G |

|  |  |  | Ex No. 7 | Com No. 1 | Com No. 2 | Com No. 3 | Com No. 4 |
|---|---|---|---|---|---|---|---|
| Magnetic paint composition | Magnetic metal powder | (Composition) | 100 parts (Fe—Al) | 100 parts (Fe—Al) | 100 parts (Fe—Al) | 100 parts (Fe—Al) | 100 parts (Fe—Al) |
|  |  | Content ratio (in terms of number of atoms) Fe:Al | 100:5 | 100:5 | 100:0.5 | 100:22 | 100:5 |
|  |  | Abundance ratio (in terms of number of atoms) Fe:Al | 50:50 | 50:50 | 70:30 | 40:60 | 80:20 |
|  |  | Specific surface area: BET value ($m^2/g$) | 50 | 40 | 50 | 50 | 50 |
|  | Vinyl chloride copolymer |  | Containing sulfonic group |  |  |  |  |
|  | Polyurethane |  |  |  |  |  |  |
|  | Alumina |  |  |  |  |  |  |
|  | Methylethyl ketone |  | Same as left | Same as left | Same as left | Same as left | Same as left |
|  | Toluene |  |  |  |  |  |  |
|  | Cycionexanone |  |  |  |  |  |  |
|  | Stearic acid |  |  |  |  |  |  |
|  | Butyl stearate |  |  |  |  |  |  |
| Properties | Luminance S/N ratio (dB) |  | 2.5 | 0 | 1.0 | 0.5 | 1.0 |
|  | Still image endurance (min.) |  | >120 | >120 | 100 | 110 | 95 |
|  | Residual saturated magnetization (%) |  | 95 | 93 | 85 | 96 | 86 |
|  | Powder falling-off |  | E | G | N | P | N |
|  | Magnetic head clogging |  | E | N | P | N | P | magnetization.
Falling-off of powder:
A sample tape was allowed to run on a videotape deck for 2000 hours under the conditions of 40° C., and 80% RH, in order to evaluate falling-off of powder.
E: Excellent
G: Good
N: Normal
P: Poor
Clogging of magnetic head:
A sample tape was allowed to run on a videotape deck for 2000 hours under the conditions of 40° C., and 80% RH, in order to evaluate clogging of the magnetic head.
E: Excellent
G: Good

EXAMPLE 2

(Preparation of video tape)

First, according to a process described below, each magnetic layer was formed on a 10 μm thick polyethylene terephthalate base film serving as a support.

Next, a specific magnetic powder and the ingredients listed in Table 2 were dispersed, and the resultant magnetic paints were filtered through a 1 μm sieve filter, and then 5 parts multifunctional isocyanate was added, and thereafter the support was coated with the resultant dispersion in a thickness of 2.5 μm and treated with a super calender. Thus the magnetic layers having the properties and compositions shown in Table 2 were formed.

The Al content in these magnetic metal powders was commonly 5 atomic %.

The ratio of iron atoms present in each magnetic metal powder, as well as degree of oxidation in the superficial portion, are summarized in Table 2.

The degree of oxidation above was measured, according to the ESCA, by determining a binding energy at an analysis depth of approx. 1000Å and less from the surface toward inside. The ratio of iron atoms present was measured by an X ray spectroscopy.

FIG. 4 graphically shows the degrees of oxidation of iron atoms at the superficial portion of individual magnetic particles.

In FIG. 4, the vertical axis corresponds with a spectral intensity measured with a counter, while the horizontal axis corresponds with binding energy (eV), wherein the respective spectrums were analyzed with a computer and were plotted to form synthetic spectrums represented in imaginary lines based on spectrums of $\gamma$-$Fe_2O_3$ and $Fe_3O_4$, in order to quantize the degrees of oxidation of iron atoms in the superficial portion of individual magnetic particles.

Next, an opposite face of the support was coated with a paint for BC layer the same as Example 1, so that the dry thickness was 0.4 μm.

Thus, the wide magnetic films respectively having a magnetic layer and BC layer of prescribed thicknesses were prepared and rolled up. A respective magnetic film was cut into 8 mm width tapes to form the video tapes specified in Table 2 (each video tape corresponding with the identification number of example or comparative example). The "parts" in the second row and below in FIG. 4 are in parts by weight; "Ex No." means an example of the invention, while "Com No." means a comparative example.

[Performance measurement of video tapes]

The measurements of performance resultant from the so-obtained tapes are listed in Table 2. The evaluations were carried out by the same method as Example 1.

TABLE 2

| | | | Ex No. 1 | Ex No. 2 | Ex No. 3 | Ex No. 4 | Com No. 1 | Com No. 2 | Com No. 3 |
|---|---|---|---|---|---|---|---|---|---|
| Magnetic paint composition | Magnetic metal powder | (Composition) | 100 parts (Fe—Al) | 100 parts (Fe—Al) | 100 parts (Fe—Al) | 100 parts (Fe—Ni—Al) | 100 parts (Fe—Al) | 100 parts (Fe—Al) | 100 parts (Fe—Al) |
| | | Oxidation degree of Fe atoms in superficial portion | $X = \frac{4}{3}$ | $X = \frac{17}{12}$ | $X = \frac{3}{2}$ | $X = \frac{17}{12}$ | $X = 1$ | $X = 2$ | $X = \frac{4}{3}$ |
| | | Ratio of Fe atoms (atomic %) | 90 | 90 | 92 | 92 | 90 | 92 | 91 |
| | | Specific surface area: BET value ($m^2/g$) | 50 | 45 | 50 | 50 | 50 | 50 | 43 |
| | Vinyl chloride copolymer | | 13 parts | Same as left | Same as left | Same as left | Same as left | Same as left | Same as left |
| | Polyurethane | | 10 parts | | | | | | |
| | Alumina | | 9 parts | | | | | | |
| | Methylethyl ketone | | 250 parts | | | | | | |
| | Toluene | | 200 parts | | | | | | |
| | Oleic acid | | 2 parts | | | | | | |
| | Stearic acid | | 2 parts | | | | | | |
| | Butyl stearate | | 1 part | | | | | | |
| Properties | Luminance S/N ratio (dB) | | 2.0 | 1.5 | 2.0 | 2.0 | 1.5 | 0 | 0.5 |
| | Still image endurance (min.) | | >120 | >120 | >120 | >120 | 80 | >120 | 50 |
| | Residual saturated magnetization (%) | | 95 | 96 | 93 | 94 | 84 | 92 | 90 |
| | Powder falling-off | | G | G | E | E | G | P | G |
| | Magnetic head clogging | | E | G | G | G | N | N | P |

What is claimed is:

1. A magnetic recording medium comprising a non magnetic support having thereon a magnetic layer comprising a binder and magnetic metal particles dispersed therein, said particles having a specific surface area of at least 45 $m^2/g$ and comprising iron atoms and aluminum atoms in an atomic concentration ratio of 100:1 to 100:20, said particles having a superficial portion which is approximately the outer 100 angstroms of each of said particles, a superficial ratio of said iron atoms to said aluminum atoms in said superficial portion being from 30:70 to 70:30.

2. The medium of claim 1, wherein said iron atoms present in said superficial portion of said particles are in an oxidized state defined as $FeO_x$ in which said x is within the range of from 4/3 to 3/2.

3. The medium of claim 1, wherein said particles comprise iron atoms and aluminum atoms in a ratio of from 100:1 to 100:8 in terms of number of atoms.

4. The medium of claim 1, wherein said specific surface area is within the range of from 50 $m^2/g$ to 70 $m^2/g$.

5. The medium of claim 1 wherein said aluminum atoms in said superficial portion are bonded to oxygen atoms.

* * * * *